Nov. 8, 1949 S. MARKLAND 2,487,350
SPEED GEAR LUBRICATION
Filed July 30, 1947 2 Sheets-Sheet 1

INVENTOR
Stanley Markland
By C. E. Odell
ATTORNEY

Nov. 8, 1949 — S. MARKLAND — 2,487,350
SPEED GEAR LUBRICATION
Filed July 30, 1947 — 2 Sheets-Sheet 2

INVENTOR
Stanley Markland
BY G. E. Odell
ATTORNEY

Patented Nov. 8, 1949

2,487,350

UNITED STATES PATENT OFFICE 2,487,350

SPEED GEAR LUBRICATION

Stanley Markland, Leyland, England, assignor to Leyland Motors Limited, Kingston on Thomas, Surrey, England, a British company Application July 30, 1947, Serial No. 764,812
In Great Britain January 12, 1946

Section 1, Public Law 690, August 8, 1946
Patent expires January 12, 1966

3 Claims. (Cl. 184—11)

This invention relates to change speed gear boxes, such as are employed, particularly on motor road vehicles, for transmission of power from an internal combustion engine to vehicle road wheels or other load.

One purpose of the invention is to improve and simplify the lubrication of bearings within the gear box. A further purpose of the invention is to utilise the inter-meshing gear wheels of the gear box as a means of propelling lubrication to bearings needing lubrication.

With these purposes in view one object of the invention is a change speed gear box in which two pairs of inter-meshing gear wheels are mounted side by side in close proximity, and channels are formed in their adjacent surfaces for conveying oil from the point of intermesh of a pair of gears to a surface to be lubricated.

A further object of the invention is a gear box in which a pair of intermeshing gears, one at least of them partly bathed in oil, is mounted in close proximity to a flat surface, oil displaced from between the intermeshing gear teeth being confined within the narrow space between the gears and the surface, from which space it may be led by suitable channels to surfaces or bearings needing lubrication.

A more specific object of the invention is a gear box containing two gear wheels of different size mounted next each other to rotate about a common axis, their adjacent faces being substantially flat and in close proximity the one to the other, the gear wheels meshing with corresponding gear wheels upon an adjacent shaft, and the larger of them having a substantially spiral groove in its flat surface extending inward from a radius equal to that of the pitch circle of the adjacent smaller gear wheel.

These and other objects of the invention will be better understood from the following description of an embodiment of the invention illustrated by way of example in the accompanying drawings.

Figure 1:
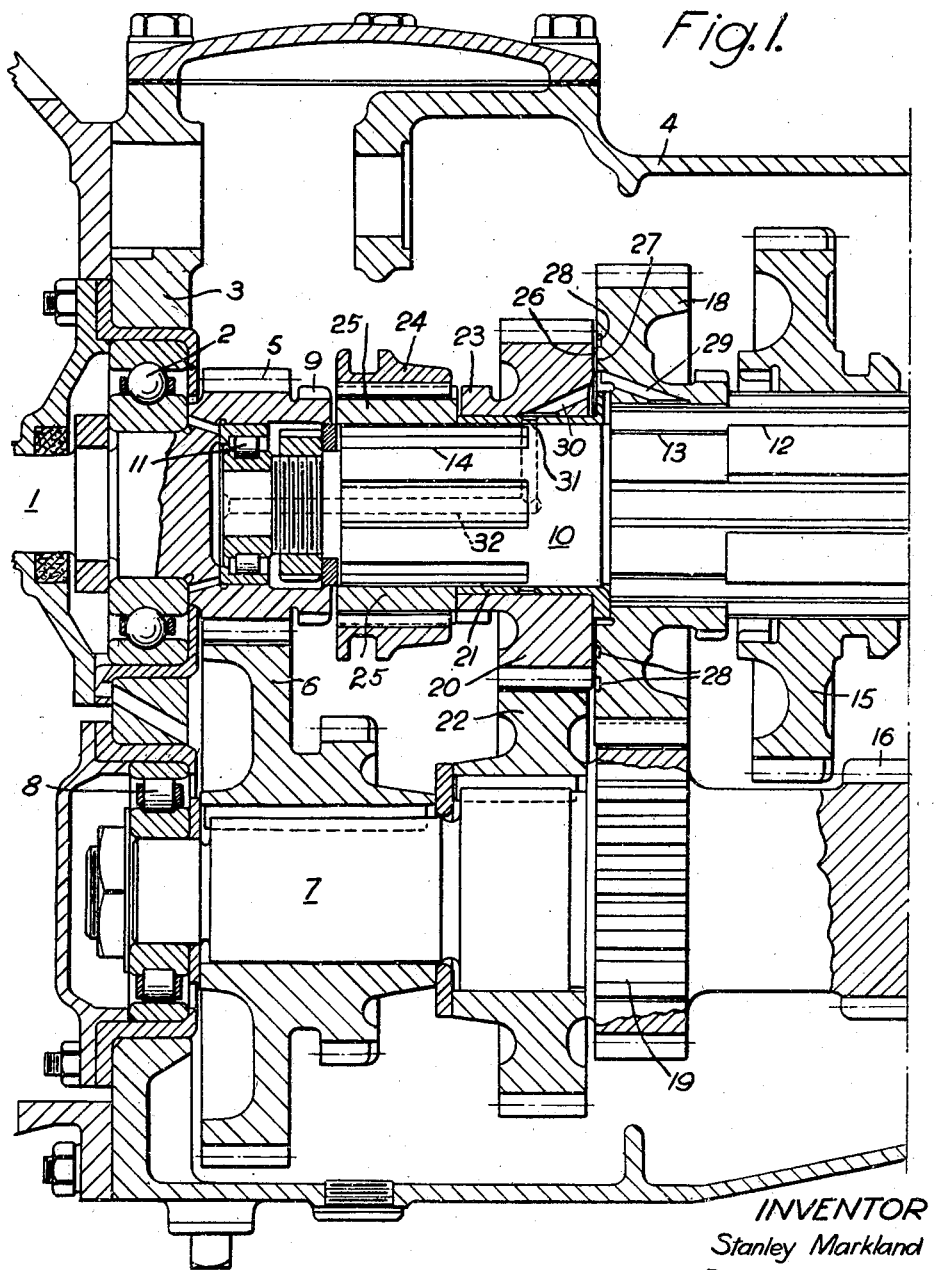
Figure 1 is a section through a part of a gear box on a plane passing through the axis of the main and lay shafts of a change speed gear.

In Figure 1 the shaft 1 represents an engine shaft, or a shaft driven from the engine through a clutch or coupling. The end of shaft 1 is supported in a bearing 2 in the end wall 3 of a change speed gear casing 4. On the end of shaft 1 beyond the bearing 2 there is a pinion 5, meshing with a gear wheel 6 keyed to a lay shaft 7, which is carried in roller bearings such as 8 in the casing 4. Integral with the pinion 5 is a dog clutch member 9.

A load shaft 10 mounted in the gear casing 4 co-axially with the driving shaft 1, has its left-hand end carried in a roller bearing 11 within the pinion 5. The shaft 10 is formed with sets of splines 12, 13, 14. The splines 12 secure to the shaft 10 one or more gear wheels 15 which can be slid along the splines into and out of mesh with corresponding pinions 16, upon the lay shaft 7. Upon the splines 13 is freely mounted the gear wheel 18 meshing constantly with the pinion 19 on the lay shaft. A gear wheel 20 is rotatably mounted on a sleeve 21 splined upon the load shaft 10 next the gear wheel 18, and meshes constantly with the gear wheel 22 keyed to the lay shaft 7. Integral with the gear wheel 20 is a dog clutch member 23. A sliding dog clutch member 24 constantly engaged with a toothed ring 25 secured upon the load shaft 10 by the splines 14 can be moved to the left to engage the dog clutch member 9 and thereby make the driving shaft 1 fast to the load shaft 10, or can be moved to the right to engage the dog clutch member 23 and thereby make the gear wheel 20 fast to the load shaft 10.

There may be a second lay shaft bearing pinions which can be slid into and out of mesh with a gear wheel and pinion such as 15 and 16 to provide a reverse gear.

It should be clearly understood that the parts so far mentioned, and so far as they have been described, are described merely as a typical change speed gear box, such as already exists, and form no necessary part of the invention; and it will be readily seen from the description which follows that the features embodying the invention may equally well be introduced into any other change speed gear of similar type.

For the purpose of the present invention at least one gear wheel, which should be a gear wheel in constant rotation and in constant mesh, such as 20, is formed with a flat face 26 and is mounted with this flat face in close proximity with another substantially flat surface, there being no more than a running clearance between the two. In the adjacent flat surface oil channels are formed, a portion of which is opposite the teeth of the flat gear.

In the construction illustrated the adjacent flat surface is the flat face 27 of the gear wheel 18, which is also a wheel in constant rotation. It is of larger diameter than the wheel 20 so that its flat face extends over the ends of teeth and tooth gaps of the wheel 20. The two wheels are so designed that their flat surfaces are separated by no more than a running clearance, say of 0.02"; the wheel 18, for example, slightly overhangs its hub on the side next the wheel 20, and the means which locate the gear wheels upon their shafts, lengthways of the shafts, are carefully designed to ensure that only this minimum clearance exists.

As usual in change speed gear boxes at least some of the gear wheels, for instance the gear wheels upon the lay shaft 7, dip into or are covered by oil contained in the gear casing 4. This oil fills the tooth gaps and is forcibly displaced lengthwise of the teeth at the point where two gear wheels intermesh. To receive so much of this oil as is displaced into the narrow gap between the wheels 20 and 18, the flat face of the latter wheel is formed with grooves or recesses forming oil channels. These are designed to receive oil from the tooth gaps at the point of intermeshing and to lead it to any bearing or surface which needs lubrication, or needs better lubrication than is afforded by the picking up of oil by the wheels. For this purpose a part of the grooves or recesses must be located at a diameter approximately equal to that of the pitch circle of gear wheel 20, in other words must lie opposite the tooth gaps from which oil is expelled at the point of intermeshing. Any other part of the oil channel constituted by a groove on the face of the gear wheel 18 should be so designed that the relative motion of the gear wheels 20 and 18 tends to forward oil along the grooves from the point at which it is received towards the surface or bearing to be lubricated.

Figure 2:
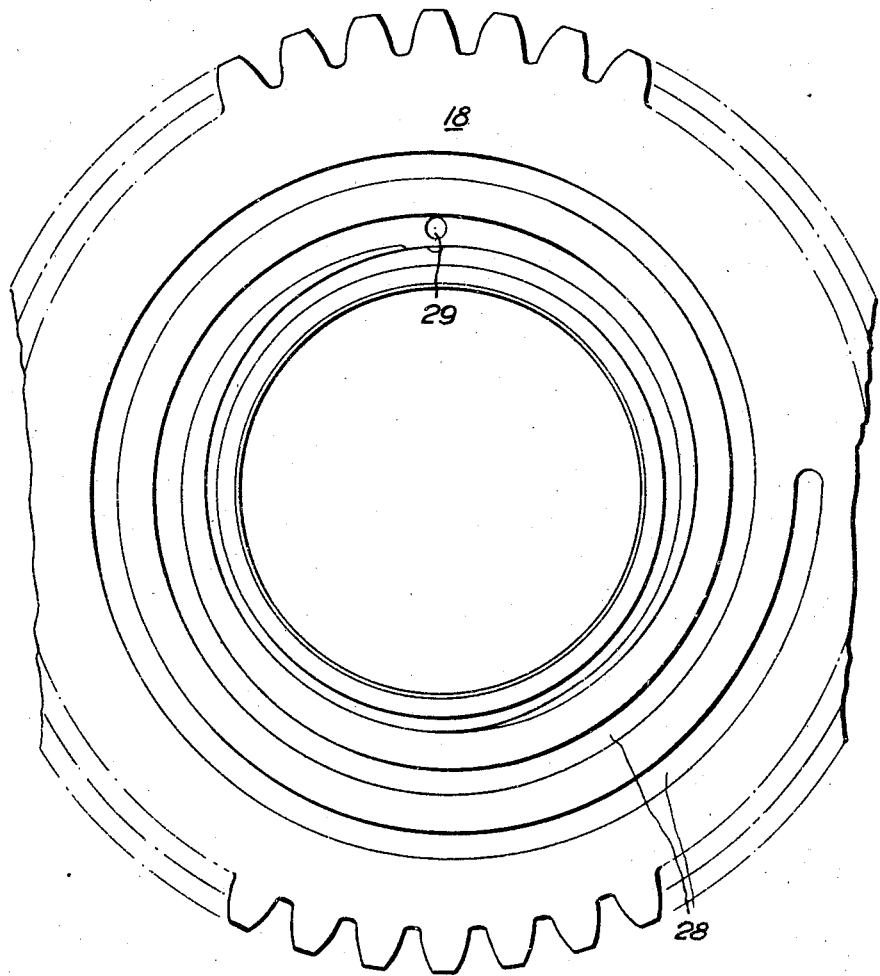
Figure 2 is an elevation of one gear wheel.

In the instance illustrated the flat face 27 of the gear wheel 18 has formed in it a spiral groove 28 as shown in Figure 2. The spiral extends to a radius approximately equal to the external radius of the gear wheel 20, while the pitch of the spiral is approximately equal to the depth of the teeth of gear wheel 20. Consequently one complete turn of the spiral is constantly in register with the tooth gaps of gear wheel 20, and some part of this turn will at any instant be opposite the point of intermesh of the gear wheels 20 and 22 and will receive the oil expelled from the tooth gaps at that point. The hand of the spiral is such that the relative motion of the gear wheels 20 and 18 tends to drag oil along the groove 28 from its outer turns towards its inner turns.

Near the inner end of the spiral groove 28 the channel 29 is bored through the gear wheel 18' from the spiral groove to the inner surface of the gear wheel hub. From this point the oil may be conveyed, by formation of special grooves or channels where necessary, to the surface on which the gear wheel 15 slides or to any other surface which does not otherwise receive sufficient lubricant.

A good example of a surface needing additional lubrication is the bearing surface of the wheel 20 upon the sleeve 21 to which oil carried on the surface of the gear wheels does not readily get access. A tunnel 30 bored in the gear wheel 20 from a point registering with an inner turn of the spiral groove 28 to the bearing surface of the wheel hub conveys oil to this bearing. Further tunnels 31, 32 bored through the sleeve 21 and shaft 10 may convey oil to the roller bearing 11, and even, if desired, to the bearing 2.

What use is made of the oil collected from the point of intermesh by the aid of the features which constitute this invention will depend on the particular design of the gearing. The invention is therefore by no means limited to the particular channels of distribution, such as 31 and 32 herein described.

It will also be apparent that the invention could as well be applied to other gears of the gear train, for example to the gear wheels 19 and 22 upon the lay shaft.

I claim:

1. In a change speed gearing a pair of intermeshing gear wheels, one of said gear wheels having a flat face, a larger gear wheel mounted co-axially with said flat-faced gear wheel, and having itself a flat face, there being only running clearance between the flat faces of the co-axially mounted wheels, said larger gear wheel having a spiral groove in its flat face one turn of which registers with the tooth spaces of the smaller flat-faced gear wheel at its point of intermeshing with the other wheel of the pair, and oil channels extending from said groove to surfaces of the gearing to be lubricated.

2. In a change speed gearing a pair of intermeshing gear wheels, one of said gear wheels having a flat face, a larger gear wheel mounted co-axially with said flat-faced gear wheel, and having itself a flat face, there being only running clearance between the flat faces of the co-axially mounted wheels, said larger gear wheel having a spiral groove in its flat face one turn of which registers with the tooth spaces of the smaller flat-faced gear wheel at its point of intermeshing with the other wheel of the pair, and oil channels in part in said larger gear wheel extending from said groove to surfaces of the gearing to be lubricated.

3. In a change speed gearing a pair of intermeshing gear wheels, one of said gear wheels having a flat face, a larger gear wheel mounted co-axially with said flat-faced gear wheel, and having itself a flat face, there being only running clearance between the flat faces of the co-axially mounted wheels, said larger gear wheel having a spiral groove in its flat face one turn of which registers with the tooth spaces of the smaller flat-faced gear wheel at its point of intermeshing with the other wheel of the pair, and oil channels in part in said smaller gear wheel extending from said groove to surfaces of the gearing to be lubricated.

STANLEY MARKLAND.

REFERENCES CITED

The following references are of record in the file of this patent:

UNITED STATES PATENTS

| Number | Name | Date |
| --- | --- | --- |
| 1,933,684 | Randolph | Nov. 7, 1933 |
| 2,285,142 | Bixby | June 2, 1942 |